(12) United States Patent
Hashmi et al.

(10) Patent No.: US 11,165,673 B2
(45) Date of Patent: *Nov. 2, 2021

(54) METHODS AND SYSTEMS FOR VISUALIZING MOBILE TERMINAL NETWORK CONDITIONS

(71) Applicant: VIASAT, INC., Carlsbad, CA (US)

(72) Inventors: Shaheem Hashmi, Carlsbad, CA (US); Sanjay V. Lala, Carlsbad, CA (US); Melanie Vrettas, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,527

(22) Filed: Feb. 19, 2020

(65) Prior Publication Data
US 2020/0259727 A1     Aug. 13, 2020

Related U.S. Application Data

(63) Continuation of application No. 15/681,867, filed on Aug. 21, 2017, now Pat. No. 10,601,684.
(Continued)

(51) Int. Cl.
*G06F 3/048*     (2013.01)
*H04L 12/26*     (2006.01)
(Continued)

(52) U.S. Cl.
CPC ........ *H04L 43/045* (2013.01); *G06F 3/04817* (2013.01); *G06F 3/04842* (2013.01);
(Continued)

(58) Field of Classification Search
None
See application file for complete search history.

(56) References Cited

U.S. PATENT DOCUMENTS

| 7,529,553 B2 | 5/2009 | Koyanagi |
| 7,933,609 B2 | 4/2011 | Lagerstedt et al. |

(Continued)

FOREIGN PATENT DOCUMENTS

WO     WO2014/160997 A1     10/2014

OTHER PUBLICATIONS

Daily Mail Reporter, "Rush hour in the skies: Real time map that shows you every plane in the air right now", http://www.dailymail.co.uk/news/article-2204838/Rush-hour-skies-Real-time-map-shows-plane-air-right-now.html. Sep. 18, 2012, 28 pgs.
(Continued)

*Primary Examiner* — William C Trapanese
(74) *Attorney, Agent, or Firm* — Holland & Hart LLP

(57) ABSTRACT

Methods and systems for visualization of mobile terminal communication link status are disclosed. In some aspects, one or more mobile terminal icons are provided for display on a map of a geographic area at map locations representing geographic locations of the mobile terminals. Coverage area icons of one or more network services are also displayed on the map. Features of the mobile terminal and coverage area icons indicate a network status of the respective terminals and coverage areas. In some aspects, prior location icons representing prior locations of the mobile terminal(s) are displayed on the map. In some of these aspects, clicking or hovering on the prior location icons provides for display, link performance data when the corresponding mobile terminal was at the geographic location represented by the prior location icon.

32 Claims, 7 Drawing Sheets

Related U.S. Application Data

(60) Provisional application No. 62/378,127, filed on Aug. 22, 2016.

(51) Int. Cl.

| | | |
|---|---|---|
| *H04W 24/02* | (2009.01) | |
| *G06F 3/0484* | (2013.01) | |
| *G06T 15/80* | (2011.01) | |
| *G06T 17/05* | (2011.01) | |
| *G06F 3/0481* | (2013.01) | |
| *H04W 24/08* | (2009.01) | |
| *H04L 12/24* | (2006.01) | |

(52) U.S. Cl.
CPC .............. *G06T 15/80* (2013.01); *G06T 17/05* (2013.01); *H04L 41/12* (2013.01); *H04L 41/22* (2013.01); *H04L 43/08* (2013.01); *H04L 43/0817* (2013.01); *H04W 24/02* (2013.01); *H04W 24/08* (2013.01)

(56) References Cited

U.S. PATENT DOCUMENTS

| | | |
|---|---|---|
| 8,094,605 B2 | 1/2012 | Lynch et al. |
| 8,260,322 B2 | 9/2012 | Allen et al. |
| 8,351,926 B1 | 1/2013 | Wright et al. |
| 8,606,266 B1 | 12/2013 | Mitchell |
| 9,080,879 B2 | 7/2015 | Maeda |
| 9,628,395 B1* | 4/2017 | Teller .................... G06F 3/0484 |
| 2001/0035880 A1 | 11/2001 | Mustov et al. |
| 2003/0083073 A1* | 5/2003 | Cossins .................. H04W 4/02 455/446 |
| 2011/0241902 A1 | 10/2011 | Shavit |
| 2012/0009951 A1 | 1/2012 | Poland |
| 2013/0166103 A1 | 6/2013 | Ko |
| 2014/0282038 A1 | 9/2014 | Royster et al. |
| 2016/0100320 A1* | 4/2016 | Dayanandan ........... H04L 41/22 455/446 |
| 2017/0086022 A1 | 3/2017 | Beattie |
| 2017/0272965 A1* | 9/2017 | Kumar .................. H04W 24/04 |

OTHER PUBLICATIONS

Nicolas, "Planefinder: Track Flights Live & Replay Flights From Past", http://www.makeuseof.com/tag/planefinder-track-flights-live/, Oct. 3, 2011, 2pgs.

Digital Inspiration, "Live Flight Tracking on Google Maps", http://www.labnol.org.internet/live-flight-tracking-google-maps/12308/, Jul. 19, 2012, 2 pgs.

Satcom Direct, Inc., "Mobile Applications" (Yonder® Toolkit), https://www.satcomdirect.com/products-and-services/mobile-apps/, 2015, 8 pgs.

\* cited by examiner

METHODS AND SYSTEMS FOR VISUALIZING MOBILE TERMINAL NETWORK CONDITIONS

CROSS-REFERENCE TO RELATED APPLICATIONS

This application for patent is a Continuation of U.S. patent application Ser. No. 15/681,867 entitled "Methods and Systems For Visualizing Mobile Terminal Network Conditions" filed Aug. 21, 2017, which claims priority to U.S. Provisional Application No. 62/378,127, entitled "Methods and Systems for Visualizing Mobile Terminal Network Conditions", filed Aug. 22, 2016, which is incorporated by reference herein.

BACKGROUND

Embodiments relate generally to communications systems, and, more particularly, to improved methods and systems for visualizing network conditions of mobile communication terminals.

Communication networks providing mobile terminal access to communications are increasing in complexity. Many communication networks may rely on many carriers (e.g., satellite beams of a multi-beam satellite system), with each carrier providing network services to a set of sometimes overlapping geographic coverage areas.

As a mobile terminal moves across a geographic region, service provided to the mobile terminal may also vary over time. In some cases, this variability may relate to the mobile terminal itself, for example, based on its own internal resource constraints, while in some cases the variability may be caused by external factors such as issues related to the access network (e.g., a multi-beam satellite system) providing the service. The multiple factors affecting network performance of an end user make troubleshooting particularly challenging. For example, it may be challenging and/or time consuming for a typical troubleshooter to quickly isolate a root cause of a reported service problem.

BRIEF SUMMARY

Disclosed are methods and systems for visualizing mobile terminals and their communications performance across a geographic region. The mobile terminals may utilize a communications link to communicate with an access network such as a multi-beam satellite system. Service performance experienced by a mobile terminal may relate to conditions particular to the mobile terminal itself. For example, an amount of data transmitted and/or received by the mobile terminal may affect network performance experienced by the mobile terminal. For example, there may be an issue with the two-way communications system within the mobile terminal itself that affect the network performance the mobile terminal experiences.

Furthermore, the service performance experienced by the mobile terminal may also or alternatively be based on the performance of the access network itself. For example, performance of the access network may relate to a number of mobile terminals utilizing the access network, an amount of data being transmitted and/or received over the access network, weather conditions in the geographic region serviced by the access network, and a variety of other factors. Performance of the access network generally may affect service performance experienced by one or more mobile terminals utilizing the access network.

Therefore, troubleshooting network performance problems experienced by a mobile terminal may be a complex undertaking, given that the mobile terminal's service performance may relate to conditions within the mobile terminal itself, and/or conditions within the access network utilized by the mobile terminal as it moves across a geographic area.

The methods and systems disclosed improve troubleshooting of these complex systems by providing a visualized presentation of one or more mobile terminals and in some cases one or more coverage areas for corresponding access networks. In some aspects, separate icons representing a mobile terminal and a coverage area for its respective access network are simultaneously provided for display on an electronic display. A map of a geographic region may also be provided for display on the electronic display. The icons may be displayed at map positions representing the geographic locations of the respective mobile terminals and access networks. The mobile terminal icon representing the mobile terminal may include a feature that indicates a status of a communication link connecting the mobile terminal to the access network. For example, if the communication link performance is nominal, the icon may be green, whereas if the communication link is experiencing issues, the icon may be yellow or red. In some aspects, hovering over the icon may display a window including a first level of detail of communication status metrics associated with the communication link. Clicking on the icon may display a window including a second level of detail of communication status metrics associated with the communication link.

The coverage area icon may include a geographic boundary of a carrier (e.g., a satellite spot beam) serviced by the access network. For example, the coverage area icon may overlay geographic points at which service is available via the carrier, but not overlay a second set of geographic points outside coverage of the carrier. The coverage area icon may include a feature that indicates a status of the carrier. In some aspects, this feature may be based on network performance data of the coverage area, such as being based on network predominance experienced by two or more mobile terminals within the coverage area and using the carrier. The coverage area icon may also use green/yellow/and red colors in some aspects (and/or other features) to indicate the network performance of the access network. By visualizing both communication status at the mobile terminal and separately communication status within a coverage area of an access network on a single electronic display, a troubleshooter may more easily isolate an end user performance issue as either mobile terminal or access network related.

Some aspects may further provide for display one or more prior location icons ("breadcrumbs") associated with the mobile terminal. The portion of the prior location icon on the map may indicate prior locations of the mobile terminal along a route of travel (also referred to herein as a "transit route"). The prior location icon may be associated with communication link performance data the mobile terminal was at the location represented by the prior location icon. A feature (e.g., color, shape, etc.) of the prior location icon may indicate status of the link performance data when the mobile terminal was at the location represented by the prior location icon. By selecting (e.g., by clicking and/or hovering) on the prior location icon, one or more of the performance link performance data may be displayed Thus, a troubleshooter may not only examine a most recent communication link status, but may easily review communication link status when a mobile terminal was at a particular prior location, for example, a location within a coverage area of a particular access network, that might be under suspicion for having a performance issue.

While the disclosed methods and systems are discussed above with respect to one mobile terminal, one of skill in the art would recognize that the discussion above can be extended to a plurality of mobile terminals. Some implementations may limit the number of prior location icons displayed for a mobile terminal based on how densely populated the map is with information. For example, some implementations may limit the number of prior location icons per mobile terminal based on the number of mobile terminals displayed on the map.

Some implementations may provide an ability to highlight particular mobile terminals that may represent special conditions deserving particular review. For example, in some aspects, special status icons or indicators may be displayed next to a mobile terminal whose communication link status meets certain conditions. In some aspects, this may be used to flag mobile terminals with particularly robust usage. In some aspects, criteria controlling the display of these indicators may be configurable. An administrative user may be able to configure the display of an indicator for a mobile terminal based on one or more communication metrics meeting individual or combined criteria.

BRIEF DESCRIPTION OF THE DRAWINGS

The present disclosure is described in conjunction with the figures.

In the figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present disclosure. However, one having ordinary skill in the art should recognize that the disclosure can be practiced without these specific details. In some instances, circuits, structures, and techniques have not been shown in detail to avoid obscuring the present disclosure.

Figure 1:
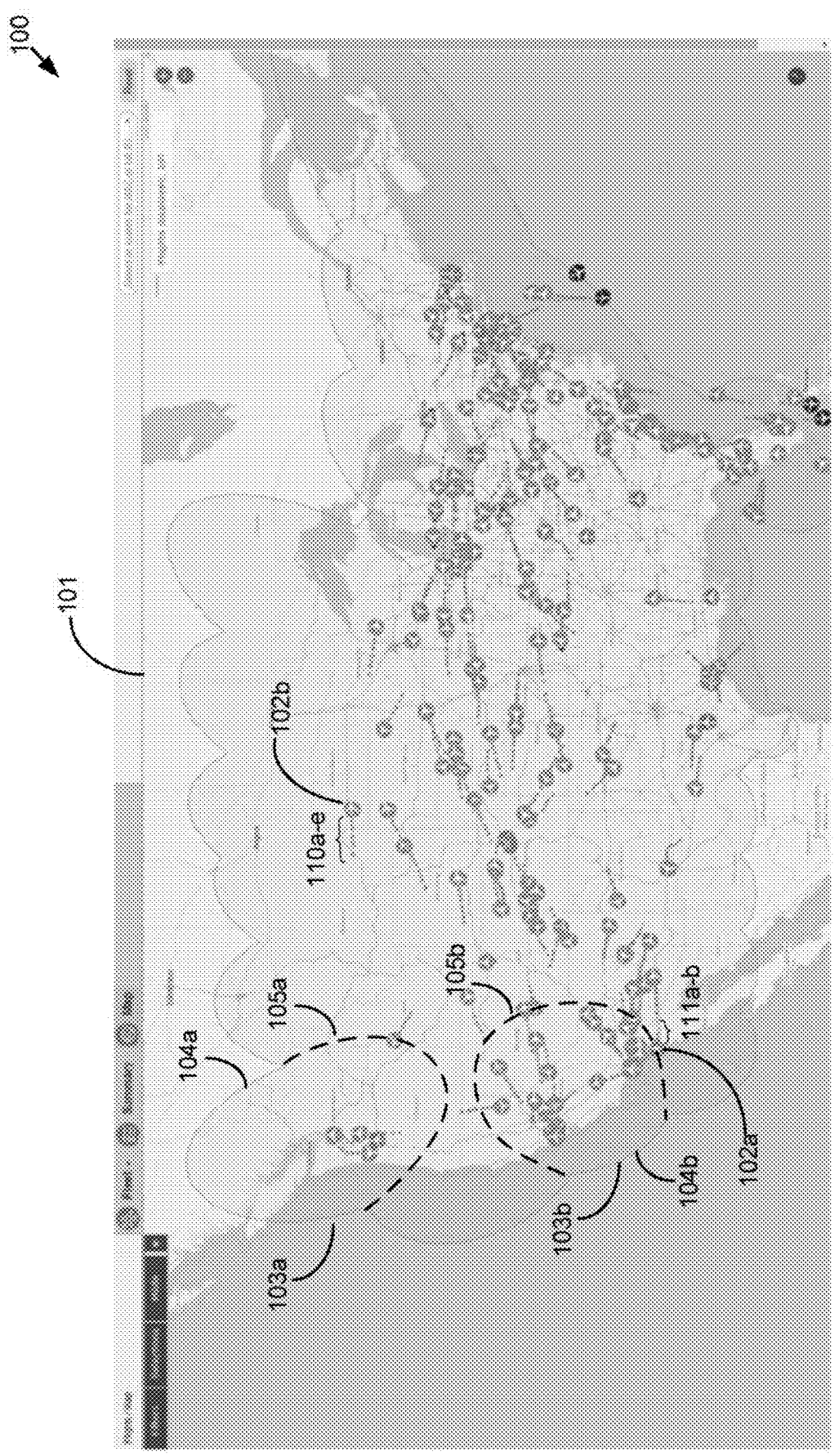
FIG. 1 is a visualization of network conditions of a plurality of mobile terminals in one exemplary embodiment.

FIG. 1 is a visualization of network conditions of a plurality of mobile terminals in one exemplary embodiment. The visualization 100 includes a map 101, in this case, a map of the continental United States. Overlaid on the map 101 are a plurality of mobile terminal icons, a subset of which are identified by icons 102a-b. In the illustrated embodiment, the mobile terminals are aircraft. Alternatively, other and/or additional types of mobile terminals may be included such as trains, cruise ships, etc.

The icons representing the mobile terminals 102a-b may include an indication of performance of a corresponding communication link between the mobile terminals and carrier of an access network. In the illustrated embodiments, the access network is a multi-beam satellite system, and the carriers are spot beams of the multi-beam satellite system. Alternatively, other and/or additional types of access networks such as an air-to-ground system may be used. For example, the icon 102a representing a mobile terminal may be shown in a first color, such as red or yellow, indicating link performance of the mobile terminal associated with icon 102a is below one or more thresholds. The icon 102b may be displayed using a second color, such as green, indicating performance of a communication link between the mobile terminal represented by icon 102b that is above one or more thresholds.

A communication link for the mobile terminals may be a wired or wireless link. The communication link may include a satellite communications link, and/or a link to a ground based antenna. The access network may provide communication services between the mobile terminal, or devices contained within the mobile terminal, and one or more other networks. For example, in some aspects, the mobile terminal may be an automobile, with the communications link providing digital communications between the automobile's diagnostic system and a vehicle manufacturer. In some other aspects, the mobile terminal may be a two-way communications system on an airplane, with the communications link providing digital communications between one or more passenger owned devices communicating with a terrestrial network, such as the internet. In some aspects, the mobile terminal may be a cell phone, with the communications link being a Wi-Fi or cellular network providing digital communications services.

Also shown on map 101 are icons of coverage areas 103a-b serviced by carriers of the access network. Coverage area 103a for example, includes a portion 104a of the coverage area 103a that may not border another coverage area, and another portion 105a of the coverage area that may overlap with a coverage area of another independent coverage area. Similarly, coverage area 103b includes a portion 104b of the coverage area 103b that may not border another coverage area, and another portion 105b of the coverage area 103b that may overlap with a coverage area of another independent coverage area. Thus, in some aspects, as shown in the exemplary embodiment of FIG. 1, an indicator of a coverage area may also identify a portion of the coverage area in some aspects, as in FIG. 1, a boundary of the coverage areas 103a-b that overlap with other coverage areas are not shown. In some aspects, the coverage areas 103a and 103b may be for a variety of types of access networks. For example, coverage area 103a may be for a satellite access network while coverage area 103b may be for a ground based antenna access network.

Figure 2:
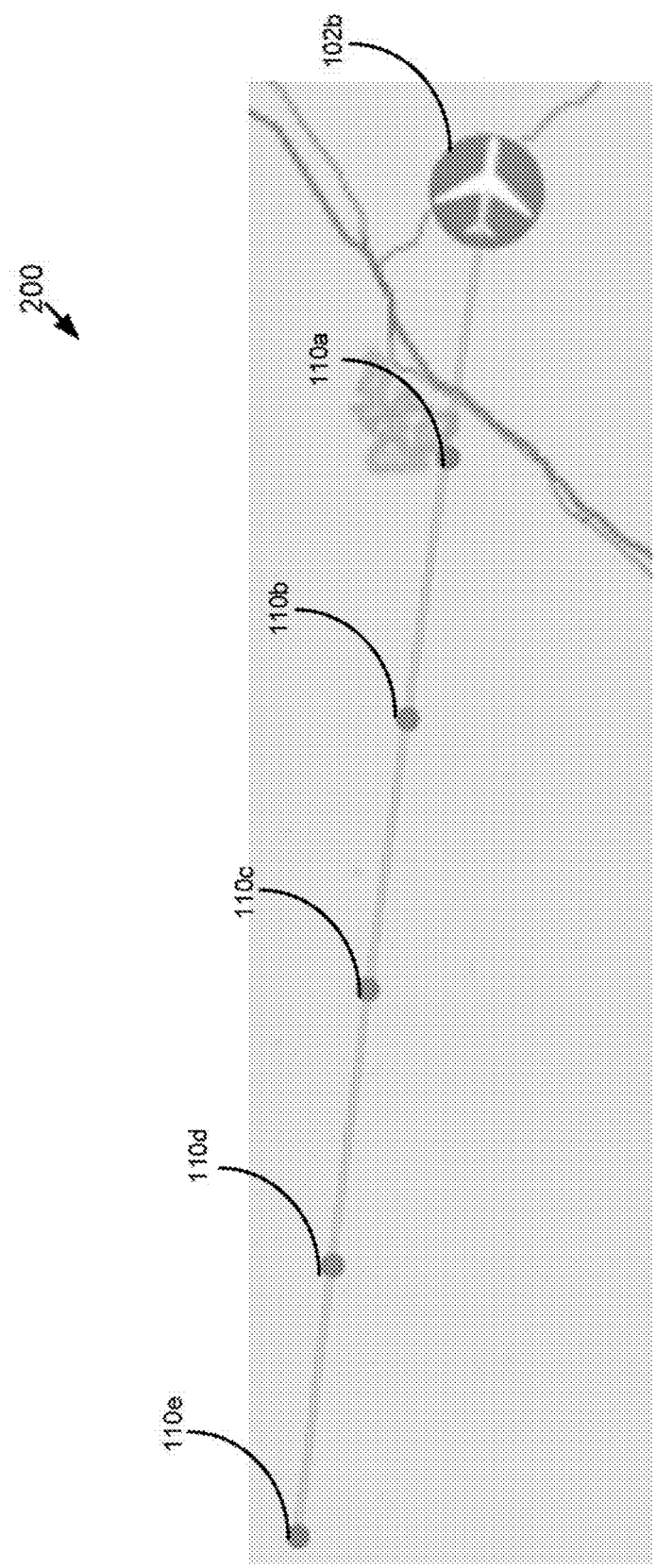
FIG. 2 is an expanded view of visual indications of prior positions of a displayed mobile terminal.

The visualization 100 also includes indications of prior positions of the displayed mobile terminals. For example, prior location icons 110a-e are shown representing prior locations of the mobile terminal 102b. This is further shown in an expanded view in FIG. 2. A feature (e.g., color, shape, etc.) of the prior location icons 110a-e may indicate status of the link performance data when the mobile terminal was at the location represented by the prior location icon.

Figure 3:
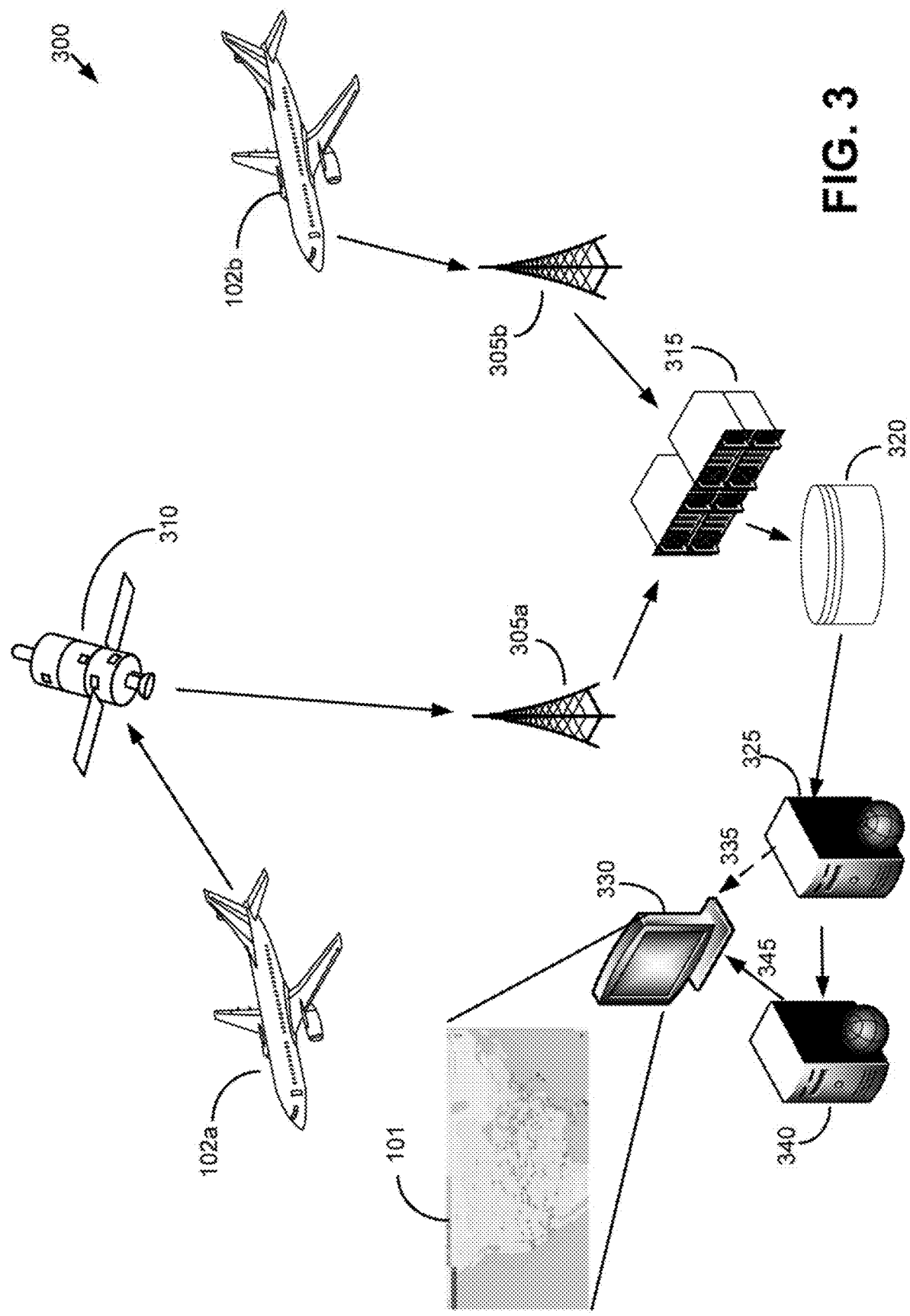
FIG. 3 is a system architecture diagram of one operative embodiment.

FIG. 3 is a system architecture diagram of one operative embodiment. The architecture 300 includes a plurality of mobile terminals, shown in FIG. 3 as aircraft 102a and 102b. Aircraft 102a includes a two-way communication system is in communication with a ground based antenna 305 via a satellite 310. Aircraft 102b includes a two-way communication system that is in direct communication with a ground based antenna 315. Both antennas 305a-b are in communication with one or more server computers 315. This, the aircraft 102a-b may exchange data with the one or more server computers 315 via the satellite 310 and/or ground based antennas 305a-b.

The one or more server computers 315 may store data in a database 320. The data stored may include information relating to one or more geographic locations of each of the mobile terminals 102a-b. For example, as the mobile terminals 102a-b travel along a transit route, they may periodically transmit their geographic location over a corresponding access network providing connectivity to the computers 315. Upon receiving the geographic location information, the server computers 315 may be configured to store the information in the database 320.

The mobile terminals 102a-b may also be configured to transmit link status information associated with their geographic location. The link status information may relate to one or more quality characteristics of one or more access networks available to the mobile terminal when at a particular geographic location. For example, the link status information may relate to one or more of latency, packet loss, throughput, network buffer sizes (queue sizes), or any other metric relating to network performance of the one or more access networks available to the mobile terminal. An example structure of the database 320 is shown below with respect to FIG. 5.

In one illustrated aspect of FIG. 3, a second computer 325 may read the data in the database 320 to prepare it for display on an electronic display 330. The second computer 325 may display the map 101 described with respect to FIG. 1 based on the data retrieved, directly or indirectly, from the database 320. This aspect is illustrated by the data flow 335 from the second computer 325 to the electronic display 330.

In another illustrated aspect of FIG. 3, the data may be provided for display to a third computer 340 instead of directly to the display 330 via data flow 345. The third computer may be directly connected to the electronic display 330, and display the map 101 on the electronic display 330.

Figure 4:
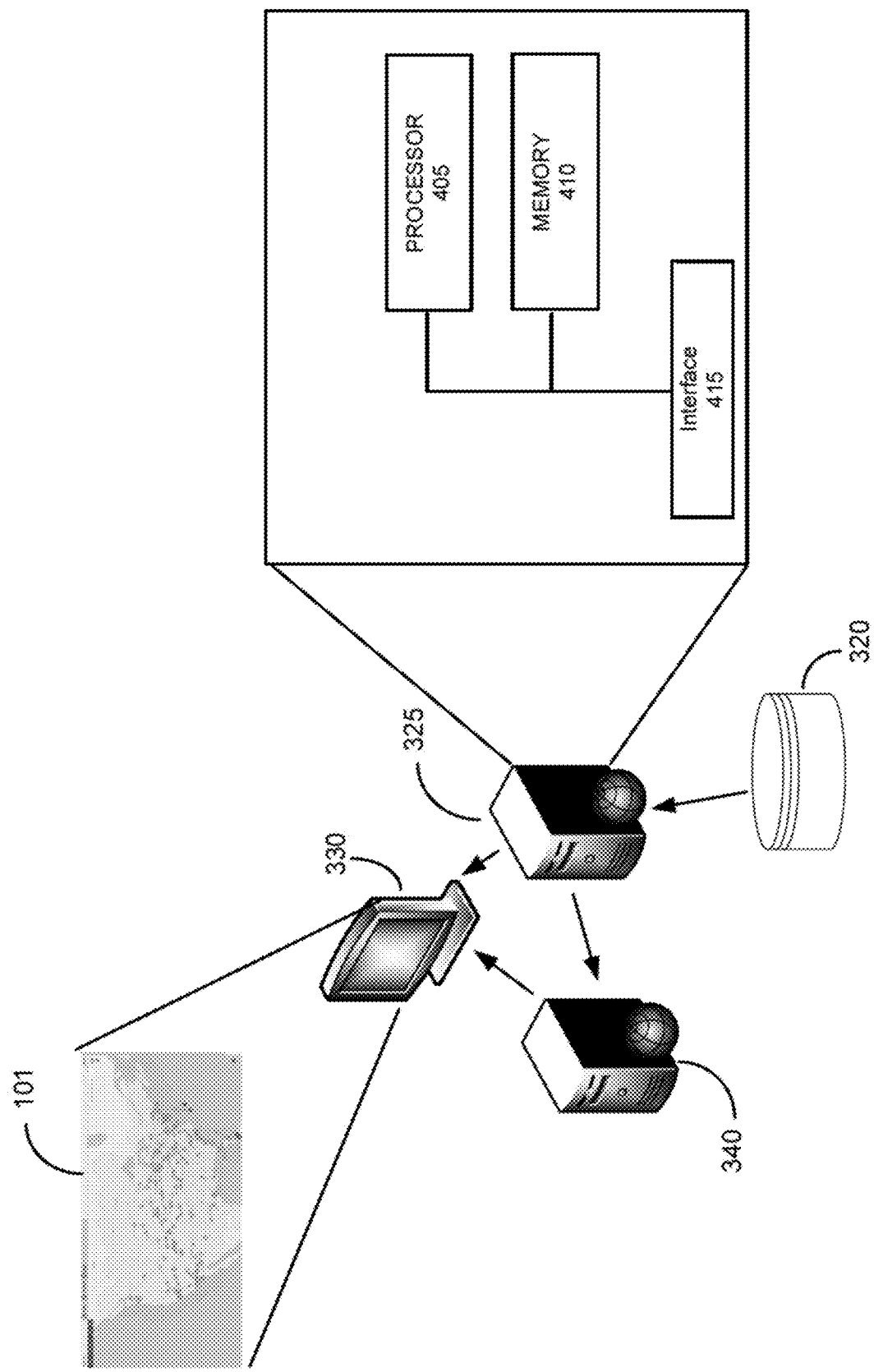
FIG. 4 shows an expanded view of a computer shown in FIG. 3.

FIG. 4 shows an expanded view of the second computer 325 of FIG. 3. The second computer 325 includes an electronic hardware processor 405, memory 410, and a network interface 415. The memory 410 may store instructions that configure the processor 405 to perform one or more of the methods or processes disclosed herein. For example, instructions in the memory 410 may configure the processor 405 to provide a map of a geographic area for display on an electronic display, such as the electronic display 330. The instructions in the memory 410 may configure the processor to obtain a geographic location of a mobile terminal, for example, from the database 230. The instructions in the memory 410 may configure the processor 405 to obtain link performance data for a corresponding communication link of the mobile terminal and/or provide for display on the map, an icon at a position on the map representing the geographic location. The instructions in the memory 410 may configure the processor to obtain network performance data for a coverage area serviced by an access network with the geographic area, and/or provide for display on the map, a coverage area icon at a position on the map representing the coverage area. One feature of the coverage area icon may be based on the network performance data for the coverage area.

While FIG. 4 shows an expanded view of the second computer 325 of FIG. 3, one of skill in the art would recognize that the third computer 340 may include a similar structure as that described above. In addition, the third computer 340 may also be configured to perform at least one or more of the functions discussed above.

Figure 5:
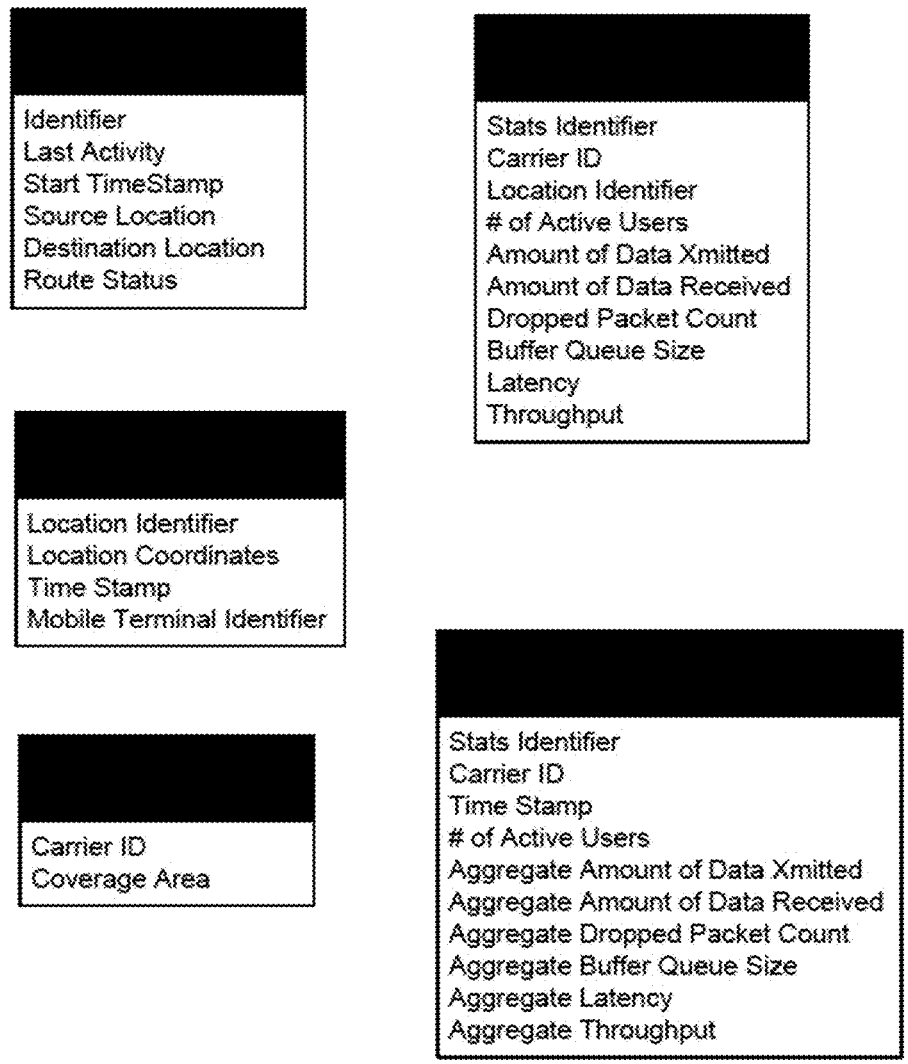
FIG. 5 shows an exemplary organization of a database.

FIG. 5 shows an exemplary organization of the database 320. The illustrated organization 500 includes a mobile terminal table 505, location table 510, link performance table 515, an access network table 520, and an access network performance table 540. The mobile terminal table 505 includes a row for at least each mobile terminal represented in the map 101. Each row of the table includes a unique identifier for the mobile terminal, a last activity timestamp, a start timestamp, a source location of a transit route, a destination location of the transit route, and a route status indication. The start timestamp may store a time at which a last route taken by the mobile terminal began. This timestamp may be used by some of the disclosed embodiments to filter location table 510 (discussed below) entries, so as to retrieve only in-progress route location information, and filter out location entries pertaining to a previous/complete route. The source and destination fields of the mobile terminal table 505 may represent most recent start and ending points for a route of the corresponding mobile terminal (identified by the identifier column). The source and destination fields may be used by some of the disclosed embodiments to determine which locations of the mobile terminal should be provided for display as prior location icons, as shown, for example, in the embodiment of FIG. 11 above. The route status column may indicate a current status of a transit route of the mobile terminal. For example, the route status column may indicate whether the route is yet to begin, in progress, or completed. This information may be utilized by some of the disclosed embodiments to determine which location information in the location table 510 pertaining to the mobile terminal should be represented as prior location icons, as shown above with respect to FIG. 1.

The location table 510 includes a row for each recorded location of a mobile terminal. Each row includes a location identifier, particular location coordinates for the corresponding location, a time stamp indicating when the location was recorded, and a mobile terminal identifier for the mobile terminal at the location at the time indicated by time stamp. Using the mobile terminal table 505 and the location table 510, the implementations disclosed can record a series of locations for a plurality of mobile terminals stored in the mobile terminal table 505. Information in the location table 510 may be used by some of the disclosed embodiments to obtain a geographic location of the mobile terminal identified by the mobile terminal identifier column of the location table 510.

The link performance table 520 stores information relating to communications performance of an individual mobile terminal over a carrier of an access network when at a particular location. In some implementations a row may be added to the link performance table 520 when link performance data is recorded for a mobile terminal. Each row includes a stats identifier, an identifier for the carrier (e.g., satellite spot beam) of access network used to determine the link performance data (identifying a carrier in the access network table 530). Each row of the link performance table 520 also includes a location identifier, indicating a location record in the location table 510 for a location at which the performance data in row was recorded. The link performance data may also include one or more measurements of performance of the communication link used by the mobile terminal via the carrier to communicate with the access network. For example, as shown, the link performance data may include one or more of a number of active users communicating via the mobile terminal, an amount of data transmitted on the forward link (absolute or within a rolling time window), an amount of data received on the return link (absolute or within a rolling time window), a dropped packet count (absolute or within a rolling time window), a size of a buffer queue, a latency measurement, and a throughput measurement.

The access network table 530 may include a row for one or more access networks that may be managed or visualized by the methods and systems disclosed. Each row of the access network table 530 includes an identifier for carriers of an access network and a coverage area of the carrier. The coverage area column may be a complex data structure to adequately define a coverage area that may be of a complex geometric shape. In some aspects, the coverage area column may define a circle or an ellipse. In some aspects, the coverage area may define a polygon. In some aspects, the coverage area may define a linear equation defining the boundaries or shape of the coverage area.

An exemplary database 320 may also include an access network performance table 540. The access network performance table 540 may store network performance data relating to a carrier of a particular access network. The performance data in the access network performance table 540 may differ from the performance data in the link performance table 520 in that each row of data in the link performance table 520 may relate to communication service experienced by a single mobile terminal via a given carrier, whereas the network performance data in the access network performance table 540 may relate to aggregate communication service experienced by multiple mobile terminals within the coverage area of the given carrier.

Rows of the access network performance table 540 may include performance data indicative of aggregate network communications between multiple mobile terminals and the access network. The differences are summarized in Table 1 below:

TABLE 1

| | Number of Mobile Terminals | Number of Carriers |
|---|---|---|
| Link Performance Table 520 | One (1) | One (1) or more |
| Access Network Performance Table 540 | Two (2) or more | One (1) or more |

Figure 6:
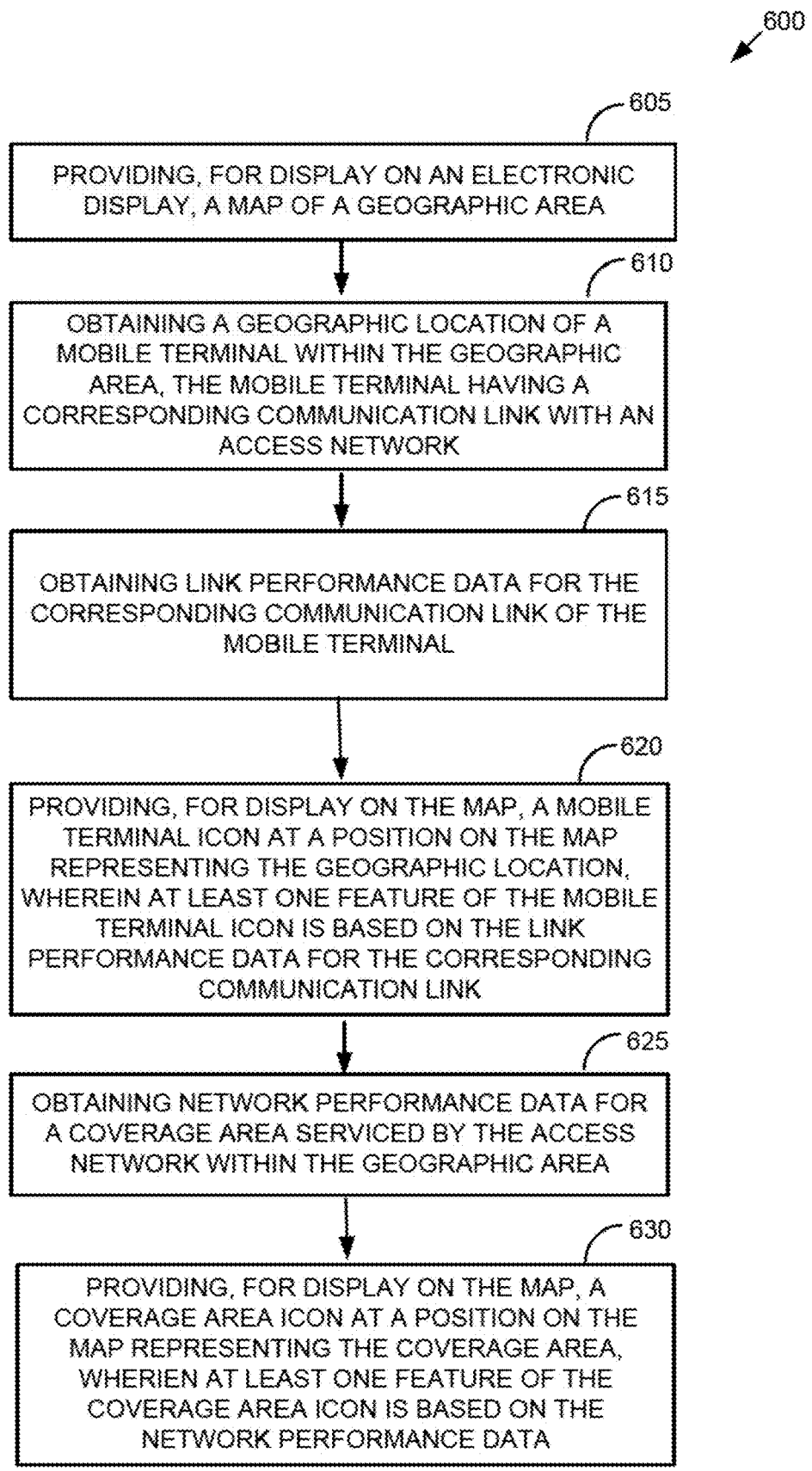
FIG. 6 is a flowchart of a method of displaying communication service performance for a mobile terminal.

FIG. 6 is a flowchart of a method of displaying communication service performance for a mobile terminal. In some aspects, the process 600 discussed below with respect to FIG. 6 may be performed by the electronic hardware processor 405, discussed above with respect to FIG. 4. For example, instructions in the memory 410 may configure the electronic hardware processor 405 to perform one or more of the functions of process 600 discussed below.

As discussed above, as mobile terminals travel along a transit route from a source location to a destination location, they may make use of one or more carriers of one or more access networks for communication service.

Each carrier may provide communication services for a particular geographic area. The size and shape of this geographic area may vary with the access network. Additionally, performance of each access network may be measured, for example, based on performance realized by mobile terminals utilizing the carrier. Thus, there are communications performance measurements associated with a particular mobile terminal across time, as it travels from location to location. There are also separate communications performance measurements associated with a particular carrier across time.

The disclosed methods and systems provide an improved way to visualize these two different types of network communications performance measurements. As shown above, in some aspects, mobile terminal icons representing mobile terminals may be displayed at their respective geographic locations on a map. A feature of each icon, such as its shape and/or color, may represent a status of communications experienced by the represented mobile terminal when at the geographic location of the icon. For example, if the icon for a mobile terminal is red, this may indicate in some aspects that the communications performance experienced by the represented mobile terminal was below some standard when the mobile terminal was at the location represented by the red icon. A green icon may indicate nominal or acceptable communications performance. In addition, the map may display a coverage area icon representing a coverage area of an access network on the map. The coverage area icon may represent an carrier utilized by the mobile terminal when at the location represented by the red or green icon discussed above. A feature of the coverage area icon may also represent communications performance of the carrier aggregated across multiple mobile terminals via multiple communication links. Thus, the map enables a user to visualize not only the communications performance particular mobile terminals may be experiencing, but communications performance of particular access networks that may be servicing the displayed mobile terminals. If for example, a mobile terminals icon is red, but a coverage area icon for the mobile terminal's respective carrier is green, a user may infer the issue is particular to the mobile terminal, and not the carrier the mobile terminal is utilizing. Conversely, if both the mobile terminal and the coverage area icon indicate poor performance, a user may infer the root cause is associated with the carrier, and not the mobile terminal.

In block 605, a map of a geographic area is provided for display on an electronic display. For example, as shown in FIG. 1 and FIG. 3, the map 101 is displayed on the electronic display 330.

In some aspects, providing for display may include writing information to a communication port electronically coupled to the electronic display, wherein the information causes the electronic display to display the map. In some other aspects, providing for display may include transmitting a graphical image of the map over a network, for example, to a client device that includes the electronic display. Upon receipt of the graphical image, the client device may be configured to display the map on the electronic display. Alternatively, instead of or in addition to a graphical image, in some aspects, data that configures the client device to draw the map may be provided. For example, in some aspects, instructions, such as intermediate Java byte code, or other programming instructions, may be transmitted from a first computer to a second computer. Upon delivery at the second computer, the instructions may be executed, causing the second computer to draw the map on the electronic display.

In block 610, a geographic location of a mobile terminal within the geographic area of the map is obtained. In some aspects, obtaining the geographic location may include receiving a message over a network from a computer, such as a webserver, that indicates the geographic location. In some aspects, obtaining the geographic location may include reading a database that stores one or more indications of the geographic location of the mobile terminal. In these aspects, the database may have been populated with the geographic location via a separate process, for example, a process that is in communication, either directly or indirectly, with a positioning system on the mobile terminal, such as a GPS receiver.

Furthermore, the mobile terminal includes a communication link via a carrier of an access network. The communication link may be a wireless link. The communication link may include a satellite communications link, and/or a link to a ground based antenna. The access network may provide communication services between the mobile terminal, or devices contained within the mobile terminal, and one or more other networks. For example, in some aspects, the mobile terminal may be an automobile, with the communications link providing communications between the automobile's diagnostic system and a vehicle manufacturer via the access network. In some other aspects, the mobile terminal may be an airplane, with the communications link providing communications between one or more passenger owned devices communicating with a terrestrial network, such as the Internet. In some aspects, the mobile terminal may be a cell phone, with the communications link being a Wi-Fi or cellular network providing communications services.

In block 615, link performance data for the corresponding communication link of the mobile terminal is obtained. In some aspects, obtaining link performance data may include reading the link performance data from the link performance table 520 discussed above with respect to FIG. 5. The link performance data may be based on communications of the individual mobile terminal over the carrier of the access network.

In block 620, a mobile terminal icon representing the mobile terminal is provided for display on the map. The mobile terminal icon is at a position on the map representing the geographic location of the mobile terminal. At least one feature of the mobile terminal icon is based on the link performance data for the corresponding communication link. For example, the color and/or shape and/or boldness level and/or size and/or font of the mobile terminal icon may be based on the link performance data. In some aspects, a green icon may indicate that the link performance data is nominal or acceptable, while a yellow or red icon may indicate that the link performance data, or a metric derived from the link performance data, is below a first or second threshold respectively.

In block 625, network performance data of a coverage area serviced by the access network within the geographic area is obtained. The coverage area referred to in block 625 includes at least a portion of the coverage area of the given carrier over which the individual mobile terminal (referred to above in blocks 610, 615, 620) is provided communication service with the access network. In some aspects, the coverage area of block 625 is only includes the coverage area of that of the carrier. In other words, the network performance data of the coverage area obtained at block 625 is for the given carrier (e.g., a spot beam of a multi-beam satellite system) over which the communication link is established between the mobile terminal and the access network. In these aspects, the coverage area icon discussed below may correspond to the coverage area of the given carrier. In other aspects, the coverage area referred to in block 625 is a composite of multiple coverage areas of multiple carriers of the access network, including the given carrier over which the individual mobile terminal is provided communication service the access network. In other words, the network performance data of the coverage area obtained at block 625 is for the multiple carriers. In these aspects, the coverage area icon discussed below may correspond to the coverage areas of the multiple coverage areas of the multiple carriers.

In some aspects, the access network may be a satellite access network. In these aspects, the coverage area may be a geographic area within a coverage area of one or more spot beams of a communications satellite, for example, as shown with respect to coverage area 103a of FIG. 1. In some aspects, the access network may be a ground based antenna access network, for example, as shown with respect to coverage area 103b of FIG. 1, and thus the coverage area may be a geographic area for which the ground based antenna access network is providing coverage.

In some aspects, obtaining access network performance data may include reading data from the access network performance table 540, discussed above with respect to FIG. 5. The network performance data differs from the link performance data in that network performance data may aggregate network performance data experienced by a plurality of mobile terminals when using a particular carrier of the access network. In contrast, link performance data may include network performance data for a particular mobile terminal only. In some cases, the link performance data may be based on communications between the mobile terminal and only one access network. In some other cases, the link performance data may be based on communications between the mobile terminal and two or more access networks.

In some aspects, the network performance data may relate to one or more of a throughput, latency, packet loss, an amount of data buffered in the network, such as a network queue sizes, or any other information indicative of performance of the access network within the geographic area.

In block 630, a coverage area icon is provided for display on the map. As shown in FIG. 1, some aspects may display, in addition to an icon representing a mobile terminal, a representation of a coverage area for an access network. As shown in FIG. 1, coverage area icons 103a and 103b are shown. Note that in some aspects, coverage area icons of adjacent or overlapping coverage areas may also be overlaid or adjacent, so a complete boundary of a particular coverage area icon may not be discernable to a viewer.

The coverage area icon may be provided for display at a position on the map representing the coverage area. At least one feature of the coverage area icon is based on the access network performance data. In some aspects, a color of the coverage area icon may be based on the network performance data. For example, a first color may be utilized when a metric derived from the access network performance data is below (or above) a first threshold. A second color may be utilized with the metric is above (or below) the first threshold but below (or above) a second threshold, and a third color may be utilized when the metric is above (or below) the second threshold. In some aspects, the first, second, and third colors may be green, yellow, and red, respectively. FIG. 1 shows all coverage areas using the same color (e.g. green). Thus, in some aspects, this represents that all access network performance data for all of the displayed coverage areas indicates approximately equivalent status (e.g. nominal). In other embodiments, a shading (e.g., cross-hatching, etc) may also or alternatively be based on the network performance data.

In some aspects, the coverage area may have a circular or elliptical shape. In some aspects, the coverage area icon may have an irregular shape. For example, the curvature of the earth, and/or power of a transmitter for an access network, and/or the range of communications supported by a particular networking technology utilized by the access network may affect the shape of the coverage area icon.

In some aspects, the functions of process 600 may be iteratively performed for a plurality of mobile terminals and/or a second plurality of coverage areas of a plurality of access networks. For example, a first plurality of mobile terminal icons may be presented for display at a plurality of positions representing a plurality of geographic locations for a plurality of mobile terminals. In some aspects, a second plurality of coverage area icons may be presented for display at a second plurality of geographic locations representing a second plurality of coverage areas for a second plurality of access networks.

In some aspects, an indication of whether the link performance data meets a criteria is obtained. Depending on the indication, a visual indicator may be presented for display identifying the mobile terminal. In some aspects, the visual indicator may identify the mobile terminal by being displayed within a neighborhood or proximity of the geographic location of the mobile terminal on the map. In some aspects, the neighborhood or proximity may be less than 20, 15, 10, 9, 8, 7, 6, 5, 4, 3, 2 or 1 pixels from a boundary of the icon representing the mobile terminal. In some aspects, the visual indicator may adjoin or overlay the icon representing the mobile terminal. In some aspects, the visual indicator may be a "dot" or "hash" mark.

For example, the one or more metrics may relate to a number of users or subscribers utilizing the access network of the mobile terminal's corresponding communication link. In some of these aspects, the criteria may relate to the number of active users and/or subscribers that are utilizing the access network via the mobile terminal's corresponding communications link. In some aspects, the visual indicator may be provided for display when a number of active users and/or subscribers exceeds a threshold.

In some aspects, the link performance data may include one or more metrics relating to an amount of data transmitted and/or received over the corresponding communication link within a time period or during a transit route. In some of these aspects, the criteria may also relate to the amount of data transmitted and/or received. For example, in some aspects, the visual indicator may be provided for display when the amount of data transmitted and/or received exceeds a threshold.

In some other aspects, the criteria may relate to one or more link performance metrics included in the link performance data, whereas the feature of the icon may be based on different link performance metrics of the link performance data. For example, in some aspects, the link performance data may include, for example, metrics relating to data rate (forward and/or return), signal quality, latency, and packet loss of the corresponding communications link. The feature of the icon may be based on the latency and throughput metrics, whereas the visual indicator may be based on one or more packet loss metric(s).

Some aspects of process 600 may include receiving an indication of a hover event for the icon. For example, if process 600 is performed by the third computer 340 shown in FIG. 3, the input may be received from an external device, such as a pointing device such as a computer mouse. If process 600 is performed by the second computer 325, that is implementing the disclosed methods and systems in conjunction with the third computer 340, receiving the indication of the hover event may include receiving a network message from the computer 340, indicating the hover event has occurred for the icon.

In response to the hover event, process 600 may provide for display, a first window. The first window may include a first set of information relating to the mobile terminal. In some aspects, the first set of information includes at least a subset of the link performance data. In some aspects, the first set of information includes the mobile terminal identifier and transit route information such as altitude and speed.

Some aspects of process 600 may include receiving an indication of a click event for the icon. For example, if process 600 is performed by the third computer 340 shown in FIG. 3, the input may be received from an external device, such as a pointing device such as a computer mouse. If process 600 is performed by the second computer 325, that is implemented the disclosed methods and systems in conjunction with the third computer 340, then receiving the indication of the click event for the icon may include receiving a network message from the computer 340, indicating the click event has occurred for the icon.

In response to the click event, process 600 may provide for display, a second window. The second window may include a second set of information relating to the mobile terminal. For example, the second set of information may include the first set of information and additional information. In some aspects, the second set of information may include a second set of information different from the first set of information. In some aspects, the second set of information includes at least a subset of the link performance data. In some aspects, the second set of information the mobile terminal identifier and transit route information such as origin, destination, departure and estimate arrival times, altitude, and speed.

Figure 7:
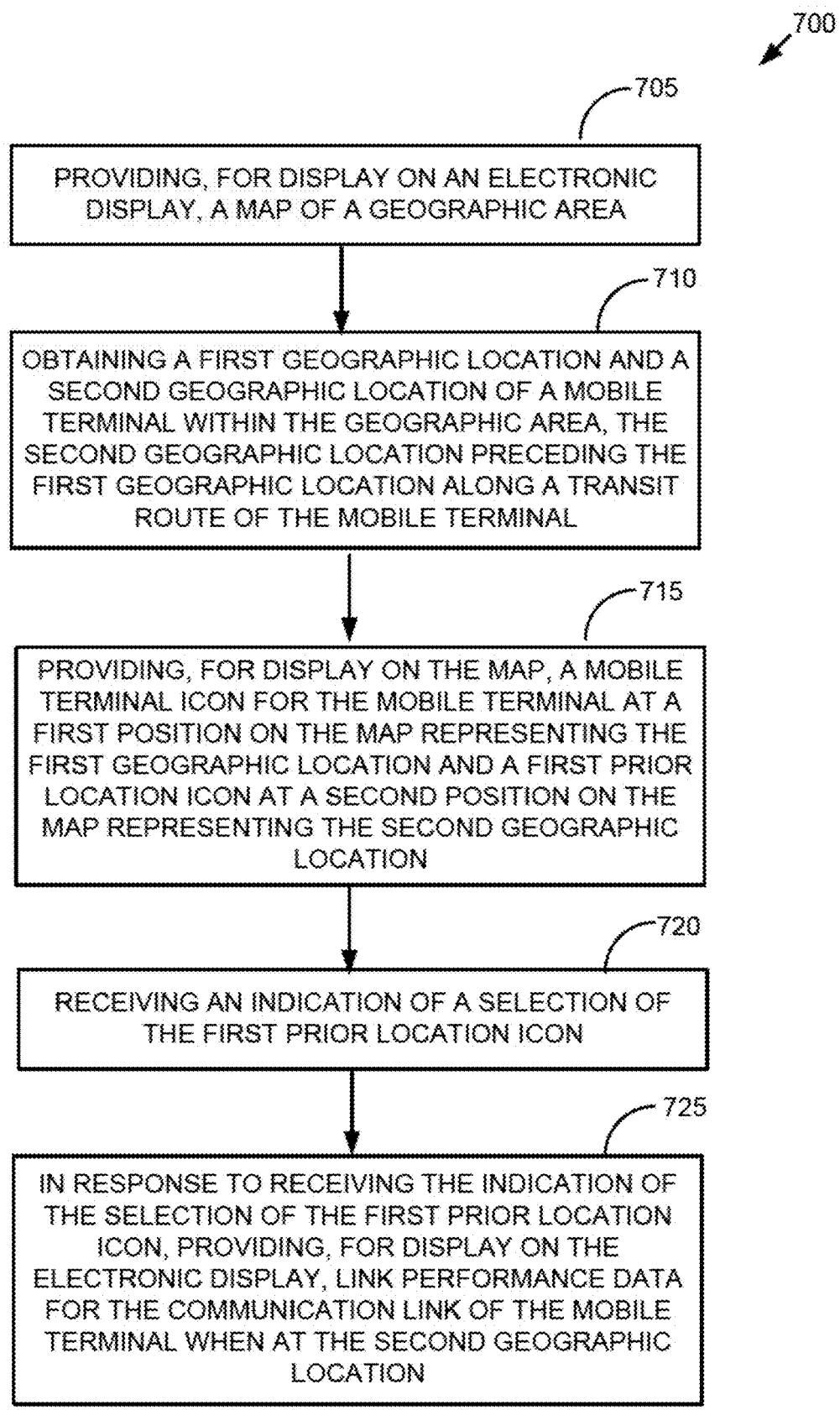
FIG. 7 is a flowchart of a method of visualizing communication performance for a mobile terminal over time.

FIG. 7 is a flowchart of a method of visualizing communication performance for a mobile terminal over time. As discussed above with respect to FIG. 1, some aspects may display the positions of one or more mobile terminals on a map via icons. In addition, in some aspects, associated with each prior location icon may be indicators of prior locations of the mobile terminal along its transit route. By selecting a prior location icon (e.g., via a click event and/or hover event), a user can review link performance data at the time the mobile terminal was at the location represented by the prior location icon. This ability to quickly and efficiently effectively "go back in time" and review link performance in the past, provides an improved network troubleshooting capability. For example, if multiple mobile terminals experience reduced network performance when within a particular geographic region or location, a network technician troubleshooting the issue may be able to isolate a root cause of the trouble away from something specific to the mobile terminal itself, and perhaps more likely to be associated with an access network servicing that particular location.

In some aspects, the process 700 described with respect to FIG. 7 may be performed by the electronic hardware processor 405 discussed above with respect to FIG. 4. For example, in some aspects, instructions stored in the memory 410 may configure the hardware processor 405 to perform one or more of the functions discussed below with respect to FIG. 7.

In block 705, a map of a geographic area is provided for display on an electronic display. For example, as shown in FIG. 1 with respect to map 101, a map of the continental United States is displayed. In some aspects, providing for display may include writing information to a communication port electronically coupled to the electronic display, wherein the information causes the electronic display to display the map. In some other aspects, providing for display may include transmitting a graphical image of the map over a network, for example, to a client device that includes the electronic display. Upon receipt of the graphical image, the client device may be configured to display the map on the electronic display. Alternatively, instead of or in addition to a graphical image, in some aspects, data that configures the client device to draw the map may be provided. For example, in some aspects, instructions, such as intermediate Java byte code, or other programming instructions, may be transmitted from a first computer to a second computer. Upon delivery at the second computer, the instructions may be executed, causing the second computer to draw the map on the electronic display.

In block 710, a first and second geographic location of a mobile terminal within the geographic area of the map is obtained. The second geographic location precedes the first geographic location along a transit route of the mobile terminal. In other words, the second geographic location is a location where the mobile terminal was prior to being at the first geographic location during a particular transit route between a source and a destination. In some aspects, the mobile terminal is currently traveling along the particular transit route. In some aspects, the first geographic location may represent a most recent geographic location of the mobile terminal available from the database 320. The second geographic location may be a location of the mobile terminal along its transit route that is prior to the most recent location. The second geographic location may be immediately prior to the first geographic location, in that there are no stored geographic locations between the first and second geographic locations in the database 320 for the specific mobile terminal, or there may be additional geographic locations between the first and second geographic locations. In some aspects, the first and second geographic locations are inclusively between a source and current location, or destination point if transit route has completed, along the mobile terminal's transit route.

In some aspects, obtaining the geographic location may include receiving a message over a network from a computer, such as a webserver, that includes the geographic location. In some aspects, obtaining the geographic location may include reading a database that stores the geographic location of the mobile terminal. In these aspects, the database may have been populated with the geographic location from a separate process, for example, a process that is in communication, either directly or indirectly, with a positioning system on the mobile terminal, such as a GPS receiver.

In block 715, a mobile terminal icon is provided for display at a first position on the map representing the first geographic location, and a first prior location icon is presented for display at a second position on the map representing the second geographic location. For example, as shown in the map 101 of FIG. 1, the mobile terminal icons 102a-b are displayed at the first geographic locations of two mobile terminals. In some aspects, one or more features of the mobile terminal icon (such as a color and/or shape of the icon, whether the icon is steady or flashing, and/or a font and/or boldness level of the icon) may be based on link performance data for the mobile terminal's communication link to an access network. For example, as shown in FIG. 1, the icon 102a may be displayed using a red color, indicating a communication link utilized by the mobile terminal represented by the icon 102a has one or more link performance metrics below a threshold. The icon 102b may be displayed using a green color, perhaps indicating nominal performance for a link in use by a mobile terminal represented by the icon 102b. Similarly, one or more features of the first prior location icon (such as color and/or shape of the icon, whether the icon is steady or flashing, and/or a font and/or boldness level of the icon) may be based on link performance data for the mobile terminal's communication link to an access network when the mobile terminal was at the geographic location represented by the first prior location icon.

In block 720, an indication of a selection of the first prior location icon is received. The icons, such as icons 102a-b shown in FIG. 1, may be selected by a human user (or an automated test system) via a user interface of a computer. For example, selection can occur by clicking and/or hovering using via a pointing device such as a mouse, a touchscreen, or via various hot key combinations.

For example, if process 700 is performed by the third computer 340 shown in FIG. 3, the indication may be an input received from an external device, such as a pointing device such as the computer mouse or touchscreen. If process 700 is performed by the second computer 325, that is implementing the disclosed methods and systems in conjunction with the third computer 340, the indication of the selection may include receiving a network message from the computer 340, indicating the selection of the first indicator has occurred.

In block 725, link performance data for the communication link of the mobile terminal when the mobile terminal was at the second geographic location is provided for display on the electronic display. The data is provided for display in response to receiving the indication of selection in block 720. In some aspects, in response to a prior location icon being selected via the user interface, information relating to communications performance at the time/place represented by the indicator may be displayed. The data displayed may include, for example, any of the communication metrics provided as examples in the description of the database 230 in FIG. 5. For example, any one or more of a number of active users, dropped packet counts, latency metrics, throughput metrics, or any measurement reflective of communication performance.

In some aspects, one or more of the blocks of process 700 may be iteratively performed. For example, in some aspects, a plurality of first and second geographic locations will be obtained for a plurality of mobile terminals. Mobile terminal icons and first prior location icons for each of the first and second geographic locations will be provided respectively for display, as discussed above with respect to block 715. For example, the map 101 discussed above with respect to FIG. 1 shows a plurality of mobile terminal icons, as mobile terminal icons 102a-b. The map 101 also shows a plurality of first prior location icons, such as first indicators 110a and 111a of FIG. 2. In some aspects, since multiple first prior location icons may be displayed, selections of two or more first prior location icons may occur, with corresponding notifications of the selections received by process 700. In other words, in some aspects, selection indications for a plurality of first prior location icons may be received, with data indicating performance of the communication link for the corresponding mobile terminal provided for display in response to the selections.

In some aspects, multiple prior location icons may be displayed for one or more of the mobile terminals displayed on the map. As the prior location icons track back away from a mobile terminal's most recent position towards an origin point of its transit route, they represent data indicating performance of the communications link of the mobile terminal when it was located at the position of the particular prior location icon. In some aspects, process 700 includes obtaining one or more additional geographic locations for the mobile terminal, the one or more geographic locations prior to the first and second geographic locations of the mobile terminal and also along the transit route taken by the mobile terminal; and providing, for display on the map, one or more corresponding second prior location icons at corresponding positions on the map representing the one or more additional geographic location.

As multiple prior location icons for a mobile terminal may be provided for display, one or more of these prior location icons may be selected by a user. When any one particular prior location icon is selected, link performance data relating to performance of the mobile terminal's communication link when the mobile terminal was at the location represented by the prior location icon will be displayed. As discussed previously, this data may include data relating to latency, throughput, number of users, packet loss, or any other indication of the link's performance. This information may facilitate troubleshooting of an access network.

In some aspects, process 700 includes receiving one or more additional indications of a selection of one or more of the second prior location icons. Data indicating performance of the communication link of the mobile terminal when the mobile terminal was at the one or more selected second prior location icons is provided for display in response to receiving the indication that the corresponding second prior location icon was selected.

Some aspects may provide for display an exception indicator, indicating that the mobile terminal's communication link to the access network has one or more parameters within an exceptional range. In some aspects, display of the exception indicator may be configurable. For example, some aspects may allow an administrator to configure one or more metrics in the link performance table 520 or combination of metrics meeting one or more conditions cause an exception condition. For example, in some aspects, the exception indicator may be used to identify mobile terminals with a number of active users above a threshold. These mobile terminals may then be more easily identified on the map 101 by use of a displayed exception indicator. In some aspects the exception indicator may be provided for display as an asterisk, hash mark, or any other graphical symbol.

Some aspects may limit the number of prior location icons displayed for each mobile terminal based on how densely populated the map 101 is with information. For example, in some aspects, the number of prior location icons may be limited based on how many mobile terminal icons are displayed on the map 101. In some aspects, the limit may be based on an absolute number of mobile terminals, such as 10, 20, 50, 100, or any number. In some aspects, the limit may be based both on a number of icons and a screen size or resolution. For example, when the map 101 is displayed on a larger screen, more information can generally be displayed. Thus, the limit on the number of icons may consider both the absolute amount of information but also the amount of screen real estate available to display it. Based on one or more of the disclosed determinations of a "density of information displayed," the number of prior location icons per mobile terminal may be limited. In some aspects, the number of prior location icons may be limited to 1, 2, 3, 4, 5, 6, 7, 8, 9, 10, 12, 15, 20, 25 or 30 prior location icons.

In some aspects, prior location icons are displayed from a source of a transit route to a destination of the transit route. For example, in some aspects, process 700 includes obtaining a plurality of geographic locations for a mobile terminal that were recorded after the transit route started, and providing for display prior location icons at geographic locations corresponding to the plurality of geographic locations. Selecting any one of the indicators may cause link performance data relating to performance of the mobile terminal's communication link when the mobile terminal was at the geographic location represented by the indicator, as discussed above, for example, with respect to block 725.

In some aspects, the disclosed methods and systems may provide for display of a map including information for a single mobile terminal. In some aspects, a menu item may be selected to transition the methods and systems into or out of this mode. In some aspects, process 700 may include receiving input defining the mobile terminal for display in the single mobile terminal view, and in response, clearing the map if necessary, of any mobile terminals not including the defined mobile terminal.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method of displaying communication service performance for a mobile terminal, comprising:
    providing, for display on an electronic display, a map of a geographic area;
    obtaining a geographic location of the mobile terminal within the geographic area, the mobile terminal having a corresponding communication link with an access network;
    obtaining link performance data for the corresponding communication link of the mobile terminal, the link performance data comprising a metric relating to an amount of data communicated over the corresponding communication link between the mobile terminal and the access network;
    providing, for display on the map, a mobile terminal icon at a position on the map representing the geographic location, wherein at least one feature of the mobile terminal icon is indicative of the metric relating to the amount of data communicated;
    obtaining network performance data for a coverage area serviced by the access network within the geographic area, the network performance data being based at least in part on an aggregate amount of data communicated by a plurality of mobile terminals using a plurality of communication links to communicate with the access network within the coverage area serviced by the access network; and
    providing, for display on the map, a coverage area icon at a position on the map representing the coverage area, wherein at least one feature of the coverage area icon is based on the network performance data for the coverage area.

2. The method of claim 1, wherein at least one of a color or a shape of the mobile terminal icon is based on the metric for the corresponding communication link.

3. The method of claim 1, wherein the at least one feature of the mobile terminal icon indicative of the metric is selected from more than two predefined features.

4. The method of claim 1, wherein at least one of a color or a shading of the coverage area icon is based on the network performance data of the corresponding coverage area.

5. The method of claim 1, wherein the amount of data communicated is within a rolling time window.

6. The method of claim 1, further comprising:
obtaining, for each of the plurality of mobile terminals, a geographic location and link performance data for a corresponding communication link;
providing, for display on the map, a plurality of mobile terminal icons at positions on the map representing the geographic locations, the plurality of mobile terminal icons comprising the mobile terminal icon;
obtaining, for a plurality of coverage areas serviced by the access network within the geographic area, respective network performance data, the respective network performance data being based on aggregate network communications between the access network and subsets of the plurality of mobile terminals within each of the plurality of coverage areas; and
providing, for display on the map, coverage area icons at positions on the map representing the plurality of coverage areas.

7. The method of claim 6, wherein the respective network performance data is based on one or more of a congestion level, latency, throughput, or packet loss rate of the aggregate network communications between the access network and the subsets of the plurality of mobile terminals within the each of the plurality of coverage areas.

8. The method of claim 6, wherein the metric is a first metric, the method further comprising:
providing, for display on the map, one or more indicators, each indicator identifying one of the plurality of mobile terminals associated with a second metric of the link performance data satisfying a threshold.

9. The method of claim 8, wherein the second metric of the link performance data comprises a data rate, a signal quality, a number of connected devices, a metric of packet loss, or a latency metric.

10. The method of claim 8, wherein each of the one or more indicators identifies the one of the plurality of mobile terminals by being displayed within a proximity of the mobile terminal icon representing the identified mobile terminal.

11. The method of claim 10, wherein each of the one or more indicators is provided for display as a dot within the proximity of the mobile terminal icon representing the identified mobile terminal.

12. The method of claim 11, further comprising:
providing the dot and the mobile terminal icon as overlaid for display.

13. The method of claim 6, wherein the plurality of coverage areas is a first plurality of coverage areas, the access network is a first access network, and the respective network performance data is first respective network performance data, the method further comprising:
obtaining, for a second plurality of coverage areas serviced by a second access network within the geographic area, second respective network performance data, the second respective network performance data being based on aggregate network communications between the second access network and subsets of the plurality of mobile terminals within each of the second plurality of coverage areas; and
providing, for display on the map, coverage area icons at positions on the map representing the second plurality of coverage areas.

14. The method of claim 1, further comprising:
receiving an indication of a hover event for the mobile terminal icon; and
providing, for display, a first window displaying a first set of information in response to the hover event.

15. The method of claim 14, further comprising:
receiving an indication of a click event of the mobile terminal icon; and
providing, for display, a second set of information including the first set of information, in response to the click event.

16. The method of claim 1, wherein the coverage area icon represents a composite of a plurality of coverage areas of a plurality of carriers of the access network, and wherein the composite of the plurality of coverage areas includes a carrier of the plurality of carriers providing communication between the mobile terminal and the access network.

17. An apparatus for displaying communication service performance for a mobile terminal, the apparatus comprising:
an electronic hardware processor;
an electronic hardware memory, operably coupled to the electronic hardware processor, and configured to store instructions that configure the electronic hardware processor to:
provide, for display on an electronic display, a map of a geographic area;
obtain a geographic location of the mobile terminal within the geographic area, the mobile terminal having a corresponding communication link with an access network;
obtain link performance data for the corresponding communication link of the mobile terminal, the link performance data comprising a metric relating to an amount of data communicated over the corresponding communication link between the mobile terminal and the access network;
provide, for display on the map, a mobile terminal icon at a position on the map representing the geographic location, wherein at least one feature of the mobile terminal icon is indicative of the metric relating to the amount of data communicated;
obtain network performance data for a coverage area serviced by the access network within the geographic area, the network performance data being based at least in part on an aggregate amount of data communicated by a plurality of mobile terminals using a plurality of communication links to communicate with the access network within the coverage area serviced by the access network; and
provide, for display on the map, a coverage area icon at a position on the map representing the coverage area, wherein at least one feature of the coverage area icon is based on the network performance data for the coverage area.

18. The apparatus of claim 17, wherein at least one of a color or a shape of the mobile terminal icon is based on the metric for the corresponding communication link.

19. The apparatus of claim 17, wherein the at least one feature of the mobile terminal icon indicative of the metric is selected from more than two predefined features.

20. The apparatus of claim 17, wherein at least one of a color or a shading of the coverage area icon is based on the network performance data of the corresponding coverage area.

21. The apparatus of claim 17, wherein the amount of data communicated is within a rolling time window.

22. The apparatus of claim 17, wherein the instructions further configure the electronic hardware processor to:

obtain, for each of the plurality of mobile terminals, a geographic location and link performance data for a corresponding communication link;

provide, for display on the map, a plurality of mobile terminal icons at positions on the map representing the geographic locations, the plurality of mobile terminal icons comprising the mobile terminal icon;

obtain, for a plurality of coverage areas serviced by the access network within the geographic area, respective network performance data, the respective network performance data being based on aggregate network communications between the access network and subsets of the plurality of mobile terminals within each of the plurality of coverage areas; and provide, for display on the map, coverage area icons at positions on the map representing the plurality of coverage areas.

23. The apparatus of claim 22, wherein the respective network performance data is based on one or more of a congestion level, latency, throughput, or packet loss rate of the aggregate network communications between the access network and the subsets of the plurality of mobile terminals within the each of the plurality of coverage areas.

24. The apparatus of claim 22, wherein the metric is a first metric, and wherein the instructions further configure the electronic hardware processor to:

provide, for display on the map, one or more indicators, each indicator identifying one of the plurality of mobile terminals associated with a second metric of the link performance data satisfying a threshold.

25. The apparatus of claim 24, wherein the second metric of the link performance data comprises a data rate, a signal quality, a number of connected devices, a metric of packet loss, or a latency metric.

26. The apparatus of claim 24, wherein each of the one or more indicators identifies the one of the plurality of mobile terminals by being displayed within a proximity of the mobile terminal icon representing the identified mobile terminal.

27. The apparatus of claim 26, wherein each of the one or more indicators is provided for display as a dot within the proximity of the mobile terminal icon representing the identified mobile terminal.

28. The apparatus of claim 27, wherein the instructions further configure the electronic hardware processor to:

provide the dot and the mobile terminal icon as overlaid for display.

29. The apparatus of claim 22, wherein the plurality of coverage areas is a first plurality of coverage areas, the access network is a first access network, and the respective network performance data is first respective network performance data, and wherein the instructions further configure the electronic hardware processor to:

obtain, for a second plurality of coverage areas serviced by a second access network within the geographic area, second respective network performance data, the second respective network performance data being based on aggregate network communications between the second access network and subsets of the plurality of mobile terminals within each of the second plurality of coverage areas; and provide, for display on the map, coverage area icons at positions on the map representing the second plurality of coverage areas.

30. The apparatus of claim 17, wherein the instructions further configure the electronic hardware processor to:

receive an indication of a hover event for the mobile terminal icon; and provide, for display, a first window displaying a first set of information in response to the hover event.

31. The apparatus of claim 30, wherein the instructions further configure the electronic hardware processor to:

receive an indication of a click event of the mobile terminal icon; and provide, for display, a second set of information including the first set of information, in response to the click event.

32. The apparatus of claim 17, wherein the instructions further configure the electronic hardware processor to:

provide, for display on the map, the coverage area icon that represents a composite of a plurality of coverage areas of a plurality of carriers of the access network, and wherein the composite of the plurality of coverage areas includes a carrier of the plurality of carriers providing communication between the mobile terminal and the access network.

* * * * *